(12) United States Patent
Sasaki

(10) Patent No.: US 10,520,913 B2
(45) Date of Patent: Dec. 31, 2019

(54) NUMERICAL CONTROLLER

(71) Applicant: FANUC CORPORATION, Minamitsuru-gun, Yamanashi (JP)

(72) Inventor: Takafumi Sasaki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 59 days.

(21) Appl. No.: 15/969,343

(22) Filed: May 2, 2018

(65) Prior Publication Data

US 2018/0329391 A1 Nov. 15, 2018

(30) Foreign Application Priority Data

May 11, 2017 (JP) .................................. 2017-094997

(51) Int. Cl.
*G05B 19/19* (2006.01)
*G05B 19/41* (2006.01)

(52) U.S. Cl.
CPC ............. *G05B 19/19* (2013.01); *G05B 19/41* (2013.01); *G05B 2219/34083* (2013.01)

(58) Field of Classification Search
CPC ................... G05B 19/41; G05B 19/19; G05B 2219/34083
See application file for complete search history.

(56) References Cited

U.S. PATENT DOCUMENTS

| 6,029,098 A * | 2/2000 | Serizawa ............. G05B 19/416 700/188 |
| 2004/0258495 A1* | 12/2004 | Kakino .................. G05B 19/00 409/132 |
| 2011/0238204 A1 | 9/2011 | Ono et al. |
| 2016/0256977 A1* | 9/2016 | Fujimoto .............. B24B 37/005 |

FOREIGN PATENT DOCUMENTS

| JP | 2003-195917 A | 7/2003 |
| JP | 2009015464 A | 1/2009 |
| WO | 2010095164 A1 | 8/2010 |

OTHER PUBLICATIONS

Decision to Grant a Patent for Japanese Application No. 2017-094997, dated Jan. 29, 2019, with translation—6 pages.

* cited by examiner

*Primary Examiner* — Vincent H Tran
(74) *Attorney, Agent, or Firm* — RatnerPrestia

(57) ABSTRACT

A numerical controller analyzes a machining program, generates movement command data for moving a main spindle relative to a workpiece, causes an interpolation unit to perform interpolation processing based on the generated movement command data, and generates and outputs interpolation data for each interpolation cycle. Further, the interpolation unit performs provisional interpolation processing according to command speed F on a non-rotating coordinate system, converts a start point and an end point of provisional interpolation to positions on a rotating coordinate system to obtain speed F' on the rotating coordinate system, obtains a ratio r of the speed F' to the command speed F, and performs main interpolation processing at speed of F/r.

1 Claim, 7 Drawing Sheets

ROTATING COORDINATE SYSTEM

NON-ROTATING COORDINATE SYSTEM

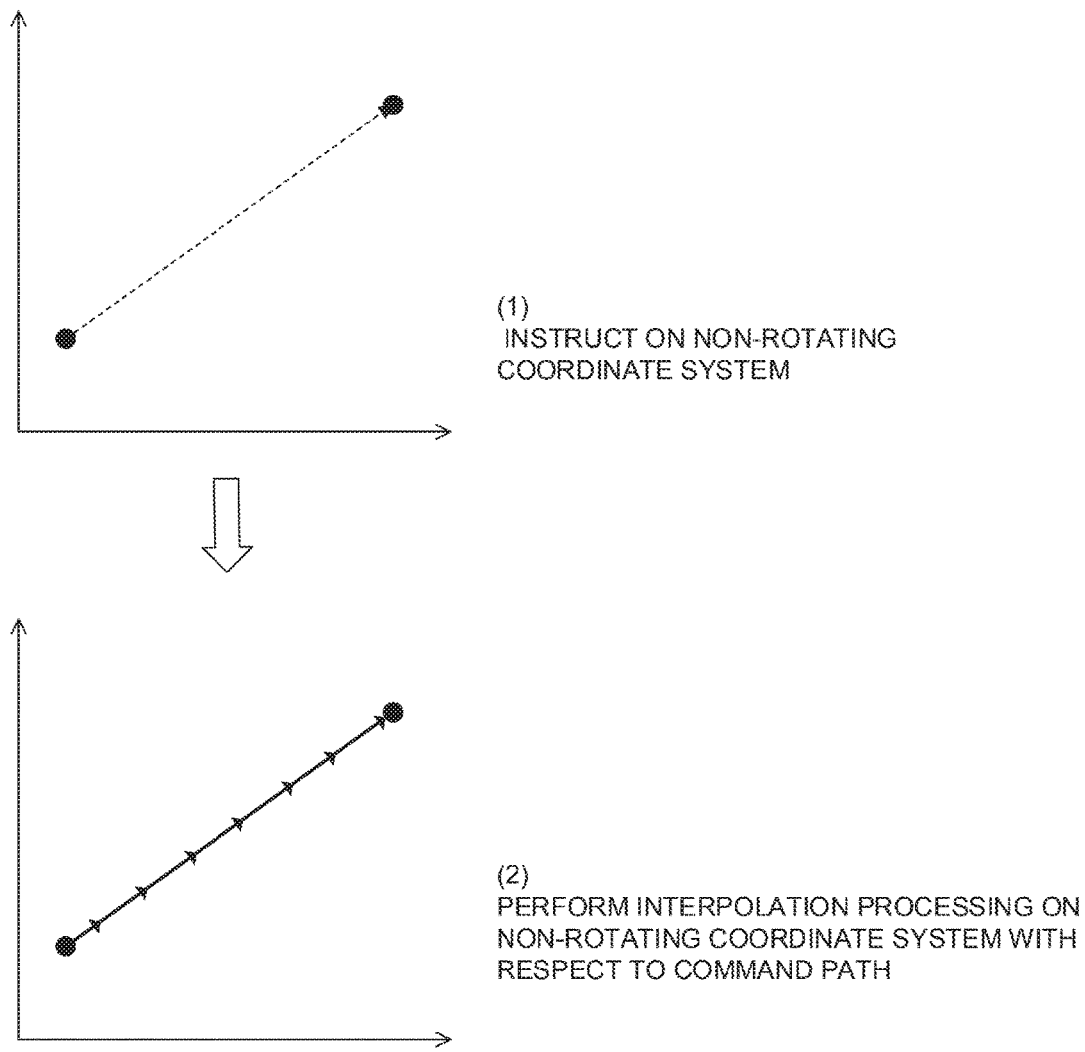

NUMERICAL CONTROLLER

CROSS-REFERENCE TO RELATED APPLICATION

This application is a new U.S. Patent Application that claims benefit of Japanese Patent Application No. 2017-094997, filed May 11, 2017, the disclosure of this application is being incorporated herein by reference in its entirety for all purposes.

BACKGROUND OF THE INVENTION

1. Field of the Invention

The present invention relates to a numerical controller.

2. Description of the Related Art

When creating a program to control a machine in which a workpiece (object to be processed) mounted on a table is rotated by a rotational axis, as a coordinate system used for the program, there are a case of using a coordinate system that rotates together with the rotation of a workpiece 1 (hereinafter referred to as a rotating coordinate system) as illustrated in FIG. 5, and a case of using a coordinate system that does not rotate together with the rotation of the workpiece 1 (hereinafter referred to as a non-rotating coordinate system) as illustrated in FIG. 6. In FIGS. 5 and 6, reference numeral 2 denotes a table that mounts the workpiece 1.

In particular, there is a case where the non-rotating coordinate system is used in multi-function machines having a function of a lathe and an NC lathe and a function of a machining center together. In such a case, the following two methods are used as a method of interpolating between program command points.

(1) Method A: Method of Performing Interpolation on Rotating Coordinate System

As illustrated in FIG. 7, coordinates of a starting point and a command point of a command path ((1) in FIG. 7), instructed on the non-rotating coordinate system (program coordinate system), are once converted into points on the rotating coordinate system. Then, interpolation processing is performed according to command speed on the rotating coordinate system based on converted coordinate values of the start point and the command point ((2) in FIG. 7), and each coordinate value of the interpolated path is converted to a coordinate value on the non-rotating coordinate system (program coordinate system) ((3) in FIG. 7). This method is disclosed in, for example, Japanese Patent Application Laid-Open No. 2003-195917.

(2) Method B: Method of Performing Interpolation According to Command Speed on Non-Rotating Coordinate System As illustrated in FIG. 8, based on coordinates of a starting point and a command point of a command path ((1) in FIG. 8) commanded on the non-rotating coordinate system (program coordinate system), interpolation processing is performed according to command speed directly on the non-rotating coordinate system (program coordinate system) ((2) in FIG. 8).

The above-described method A has an advantage in that relative speed between a tool and a workpiece becomes command speed F instructed by a program instruction, but has a disadvantage in that an actual path deviates from the command path because an interpolation path viewed from the program coordinate system (non-rotating coordinate system) is affected by a rotational axis. For example, when a linear interpolation instruction is issued, an actual tool path viewed from the non-rotating coordinate system (program coordinate system) does not become a straight line as illustrated in (3) of FIG. 7.

In addition, the above-described method B has an advantage in that an interpolation path viewed from the non-rotating coordinate system (program coordinate system) is obtained as instructed, but has a disadvantage in that it is difficult to know how the relative speed between the tool and the workpiece varies because speed of the tool as viewed from the non-rotating coordinate system (program coordinate system) is the command speed.

The respective disadvantages of both the methods described above become significant when a command path length instructed by a program block is relatively long. Although the method B is desirable considering the influence of the path, in this case, there occurs a problem that quality of a cut surface deteriorates, for example, because the relative speed between the tool and the workpiece does not become the command speed as described above. Further, as it is necessary, in laser machining, to control an output of laser in accordance with the relative speed between the tool and the workpiece, there is a problem that it is difficult to make the output constant.

SUMMARY OF THE INVENTION

Therefore, an object of the present invention is to provide a numerical controller capable of keeping relative speed between a tool and a workpiece substantially constant while preventing an actual path from deviating from a command path even when machining is performed while rotating the workpiece with respect to the tool.

In the numerical controller of the present invention, when performing interpolation processing, provisional interpolation is first performed according to command speed F on a non-rotating coordinate system, a start point and an end point of provisional interpolation are converted to positions on a rotating coordinate system to obtain speed F' on the rotating coordinate system, and a ratio r of the speed F' relative to the command speed F is obtained. Then, the command speed F is adjusted based on the obtained ratio and main interpolation on the non-rotating coordinate system is performed, whereby it is possible to keep the relative speed between the tool and the workpiece substantially constant.

The numerical controller according to the present invention controls a machine tool, which has a plurality of linear movement axes and at least one rotational movement axis for a table and is provided with the tool, based on a machining program and continuously machines the workpiece fixed on the table using the tool. The numerical controller includes: an instruction analysis unit that reads an instruction block from the machining program and analyzes the read instruction block and generates movement command data for moving the tool relative to the workpiece; and an interpolation unit that performs interpolation processing based on the movement command data and generates and outputs interpolation data for each interpolation cycle. Further, the interpolation unit includes an extended interpolation unit which performs provisional interpolation processing according to the command speed F, instructed based on the machining program on the non-rotating coordinate system, converts a start point and an end point of an interpolation path obtained by the provisional interpolation processing to positions on the rotating coordinate system to obtain the speed F' on the rotating coordinate system, obtains the ratio r of the speed F' relative to the command speed F, and performs main interpolation processing on the non-rotating coordinate system at speed obtained by multiplying the command speed F by the reciprocal of the ratio r.

According to the present invention, the relative speed between the tool and the workpiece becomes constant (at a command speed) even when the length of a block is long, as a result, it is possible to make quality of a cut surface constant, and further, it is possible to realize machining with laser output kept constant in laser machining.

BRIEF DESCRIPTION OF THE DRAWINGS

FIG. 8 is a view for describing an operation in the case of performing interpolation processing on the non-rotating coordinate system.

DETAILED DESCRIPTION OF THE PREFERRED EMBODIMENTS

Hereinafter, an example of configuration of a numerical controller to implement the present invention will be described. However, the configuration of the numerical controller of the present invention is not limited to the following example, and any configuration may be adopted as long as the configuration can realize the object of the present invention.

Figure 1:
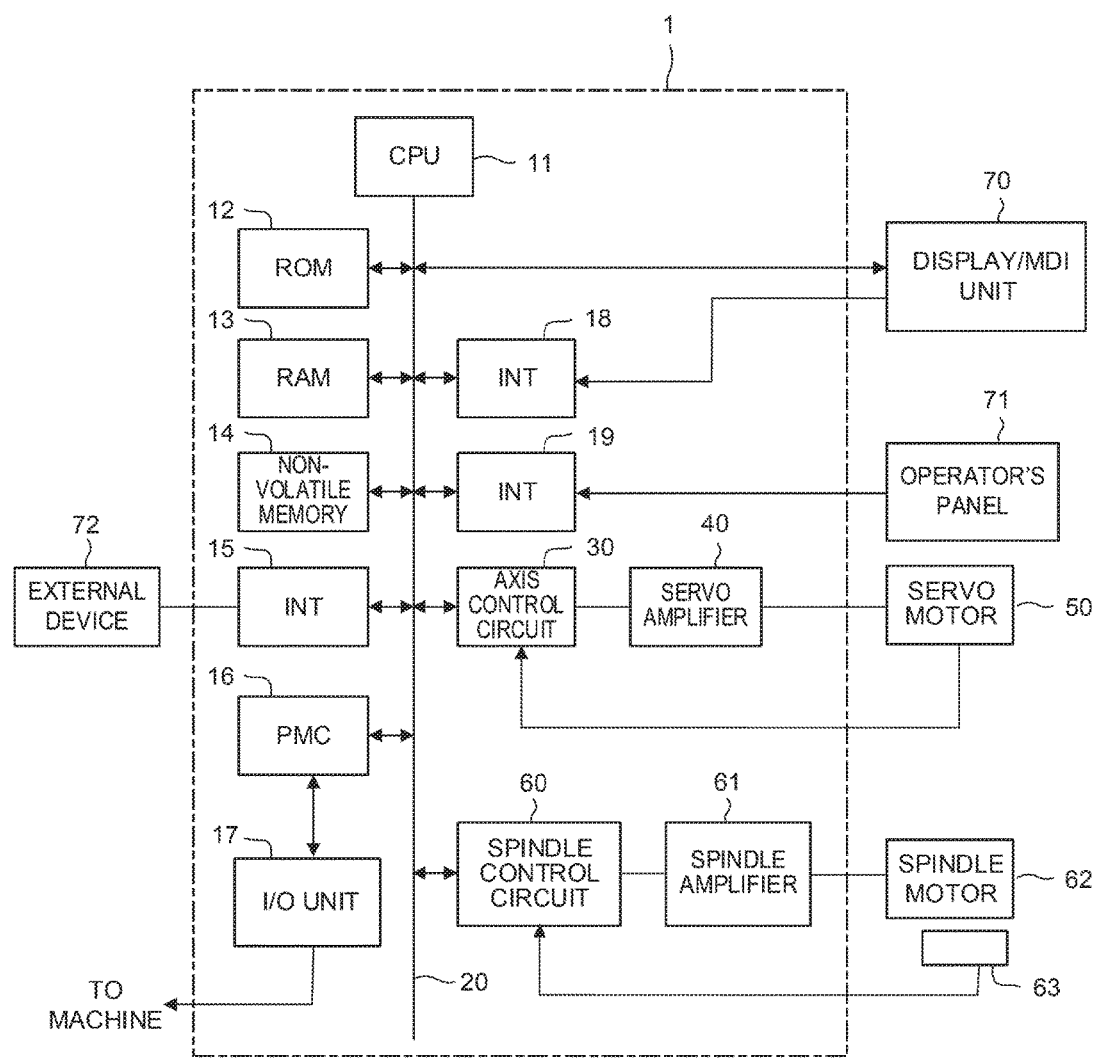
FIG. 1 is a schematic hardware configuration diagram illustrating a numerical controller according to one embodiment and a main part of a machine tool controlled by the numerical controller.

FIG. 1 is a schematic hardware configuration diagram illustrating the numerical controller according to an embodiment of the present invention and a main part of a machine tool controlled by the numerical controller.

A CPU 11 included in a numerical controller 1 according to the present embodiment is a processor that controls the numerical controller 1 as a whole. The CPU 11 reads a system program stored in a ROM 12 via a bus 20, and controls the entire numerical controller 1 according to the system program. Transitory calculation data and display data, various types of data input by an operator via a display/MDI unit 70 to be described later, and the like are stored in a RAM 13.

A non-volatile memory 14 is configured as a memory whose storage state is maintained even when a power supply of the numerical controller 1 is turned off, for example, by being backed up by a battery (not illustrated). A machining program read via an interface 15, a machining program input via the display/MDI unit 70 to be described later, and the like are stored in the non-volatile memory 14. A program for operation processing of a machining program operation and the like, used for operating the machining program is further stored in the non-volatile memory 14, but these programs are developed in the RAM 13 at the time of being executed. In addition, various system programs for execution of processing in an edit mode and the like, required to create and edit a machining programs, (including a system program for interpolation processing) are written in advance in the ROM 12.

The interface 15 is an interface configured to connect the numerical controller 1 and an external device 72 such as an adapter. The machining program, various parameters, and the like are read from the external device 72 side. In addition, the machining program edited in the numerical controller 1 can be stored in an external storage means (not illustrated) via the external device 72. A programmable machine controller (PMC) 16 outputs a signal to a peripheral device (for example, an actuator such as a robot hand for tool change) of the machine tool according to a sequence program incorporated in the numerical controller 1 via an I/O unit 17, thereby controlling the peripheral device. In addition, the PMC 16 receives a signal from various switches of an operator's panel provided in the main body of the machine tool, performs necessary signal processing on the received signal, and then, passes the processed signal to the CPU 11.

The display/MDI unit 70 is a manual data input device including a display, a keyboard, and the like. An interface 18 receives an instruction and data from the keyboard of the display/MDI unit 70, and passes the received instruction and data to the CPU 11. An interface 19 is connected to an operator's panel 71 including a manual pulse generator or the like used when manually driving each axis.

An axis control circuit 30 configured to control an axis of the machine tool receives a movement command of the axis from the CPU 11 and outputs the command for an axis to a servo amplifier 40. The servo amplifier 40 receives this command and drives a servomotor 50 to move the axis of the machine tool. The servomotor 50 of the axis incorporates a position and speed detector, feeds a position and speed feedback signal from the position and speed detector back to the axis control circuit 30 to perform feedback control of the position and speed.

Although each number of the single axis control circuit 30, the single servo amplifier 40, and the single servomotor 50 is one in the hardware configuration diagram of FIG. 1, these units are actually prepared as many as the number of axes of a machine tool to be controlled. For example, in the case of a five-axis machine tool having three linear axes and two rotational axes, the axis control circuit 30, the servo amplifier 40, and the servomotor 50 are prepared for each of the five axes including an X axis, a Y axis, and a Z axis which are linear axes, and an A axis and a C axis which are rotational axes.

A spindle control circuit 60 receives a spindle rotation command for the machine tool and outputs a spindle speed signal to a spindle amplifier 61. The spindle amplifier 61 receives the spindle speed signal, rotates a spindle motor 62 of the machine tool at commanded rotation speed to drive the tool.

A position detector 63 is coupled to the spindle motor 62. The position detector 63 outputs a feedback pulse in synchronization with rotation of a spindle, and the feedback pulse is read by the CPU 11.

Figure 2:
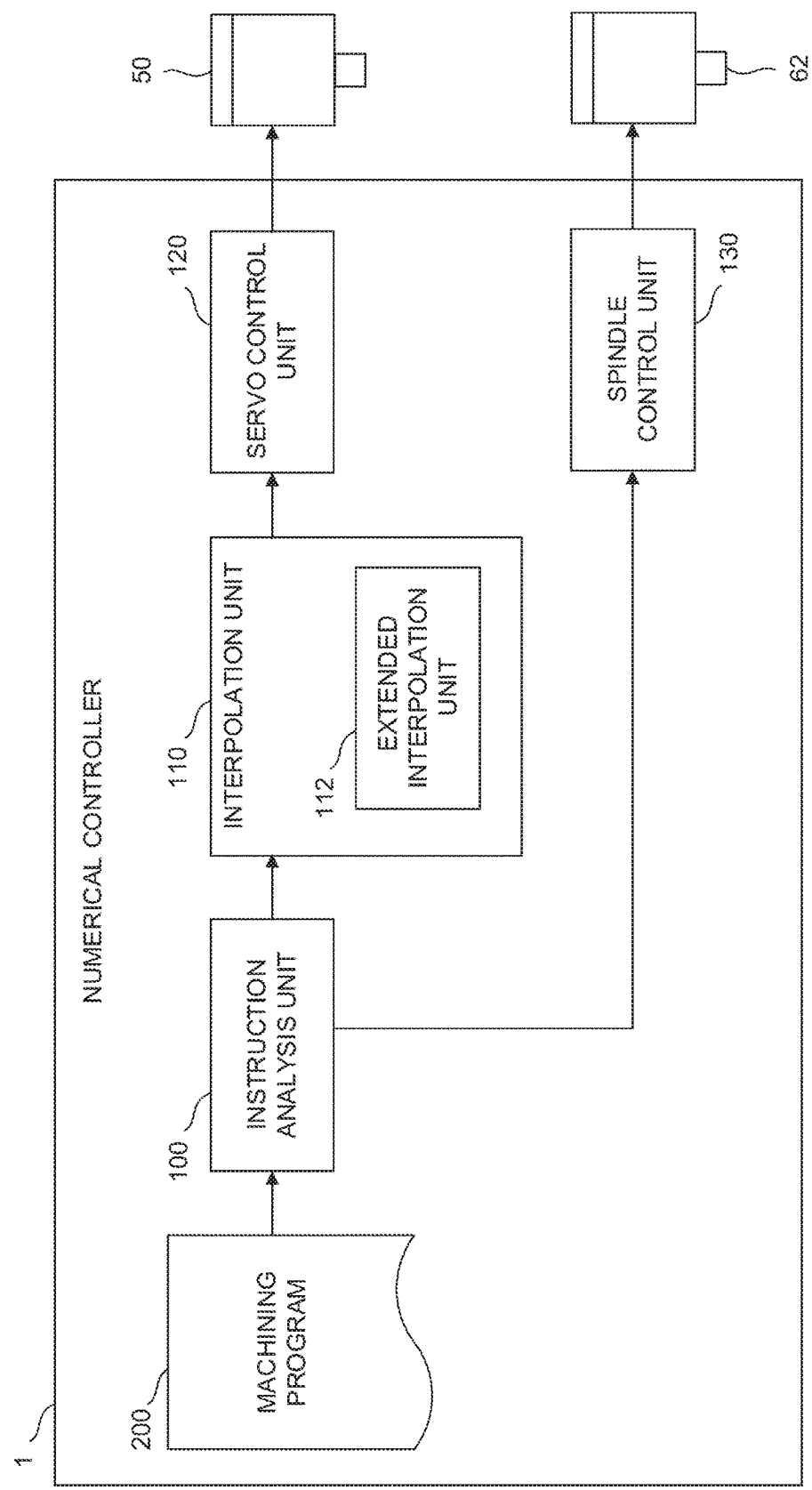
FIG. 2 is a schematic functional block diagram of the numerical controller according to one embodiment.

FIG. 2 is a schematic functional block diagram of the numerical controller according to one embodiment of the present invention when a system program, configured to realize an extended interpolation function, is installed in the numerical controller 1 illustrated in FIG. 1.

Each functional block illustrated in FIG. 2 is realized as the CPU 11 included in the numerical controller 1 illustrated in FIG. 1 executes the system program of the extended interpolation function and controls an operation of each unit of the numerical controller 1. The numerical controller 1 of the present embodiment includes an instruction analysis unit 100, an interpolation unit 110, a servo control unit 120, and a spindle control unit 130.

The instruction analysis unit 100 sequentially reads instruction blocks included in a machining program 200 from the non-volatile memory 14, analyzes the read instruction blocks, and calculates movement command data including an instruction value F of feeding speed of the spindle and spindle rotation command data including an instruction value S of spindle rotational speed.

The interpolation unit 110 generates interpolation data obtained by performing interpolation calculation of points on a command path, which are instructed based on the movement command data, at an interpolation cycle (control cycle) based on the instruction value F of the feeding speed of the spindle calculated by the instruction analysis unit 100. The interpolation processing performed by the interpolation unit 110 is performed at each interpolation cycle (control cycle).

In addition, the interpolation unit 110 includes an extended interpolation unit 112 that performs extended interpolation processing instead of normal interpolation processing when a rotational axis that rotates the workpiece relative to the main axis is driven. The extended interpolation unit 112 performs the extended interpolation processing to keep relative speed between the tool and the workpiece substantially constant according to the following procedure when the rotational axis that rotates the workpiece relative to the spindle is being driven. Incidentally, a method of converting a coordinate value between a non-rotating coordinate system and a rotating coordinate system has already been well known by, for example, Japanese Patent Application Laid-Open No. 2003-195917, and thus, will not be described in this specification.

Procedure 1: Provisional interpolation is performed according to command speed on the non-rotating coordinate system in the above-described method B.

Procedure 2: A start point and an end point of an interpolation path obtained by the provisional interpolation processing are converted to positions on the rotating coordinate system to obtain speed F' on the rotating coordinate system.

Procedure 3: A ratio r of the speed F' to the command speed F instructed by the program is obtained.

Procedure 4: Main interpolation processing on the non-rotating coordinate system is performed at speed obtained by multiplying the command speed F by the reciprocal of the ratio r.

Figure 3:
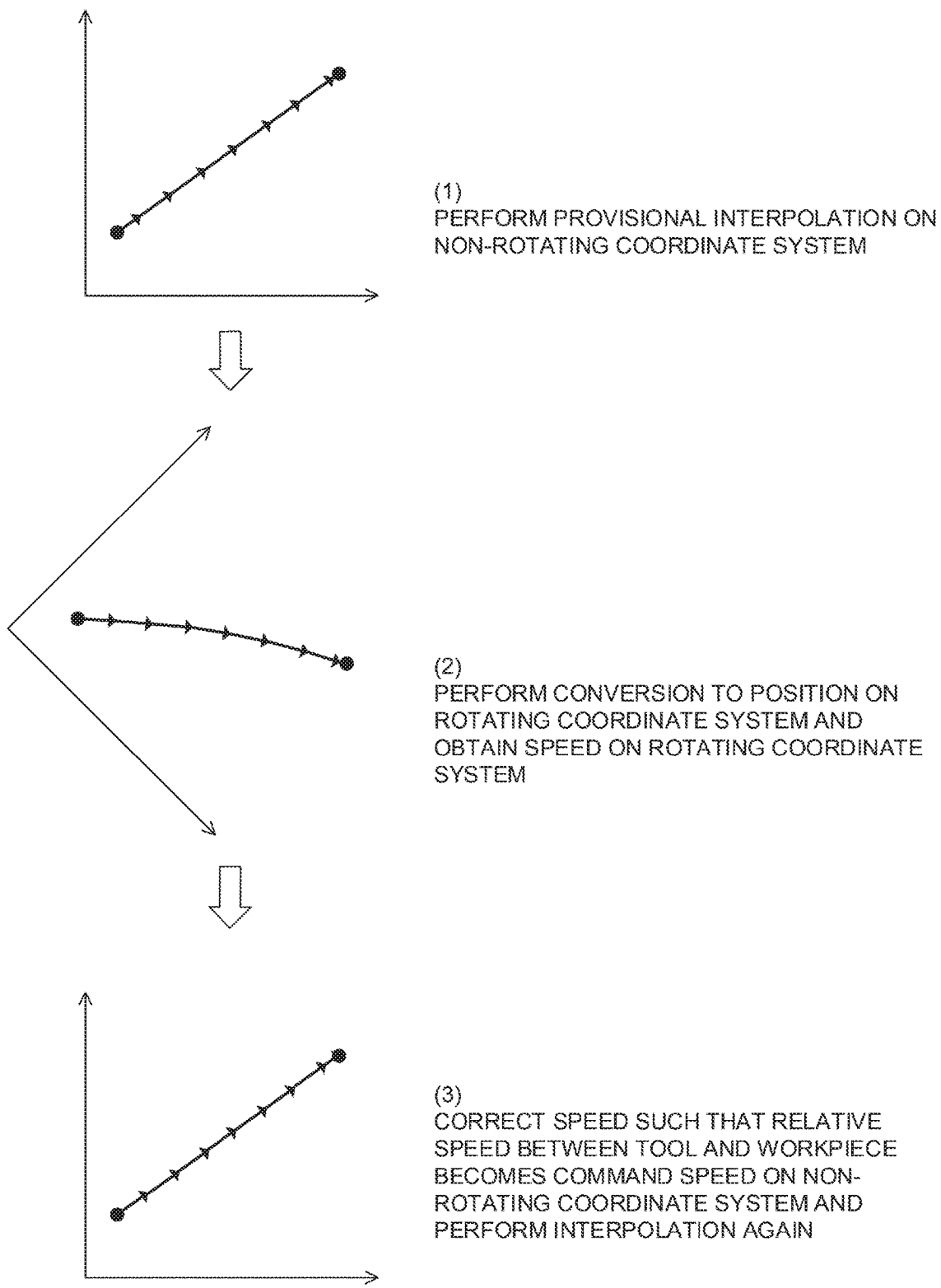
FIG. 3 is a view for describing an outline of extended interpolation processing.

FIG. 3 is a view illustrating an outline of the extended interpolation processing.

In the extended interpolation processing, the interpolation processing is performed on the non-rotating coordinate system so that the interpolation path is obtained in accordance with the command path, and further, the speed is adjusted based on the speed on the rotating coordinate system so that the relative speed between the tool and the workpiece can be kept substantially constant as illustrated in FIG. 3.

The servo control unit 120 controls the servomotor 50 driving each axis of a machine to be controlled based on the interpolation data generated by the interpolation unit 110.

In addition, the spindle control unit 130 controls the spindle motor 62 that rotates the spindle of the machine to be controlled based on the spindle rotation command data.

Figure 4:
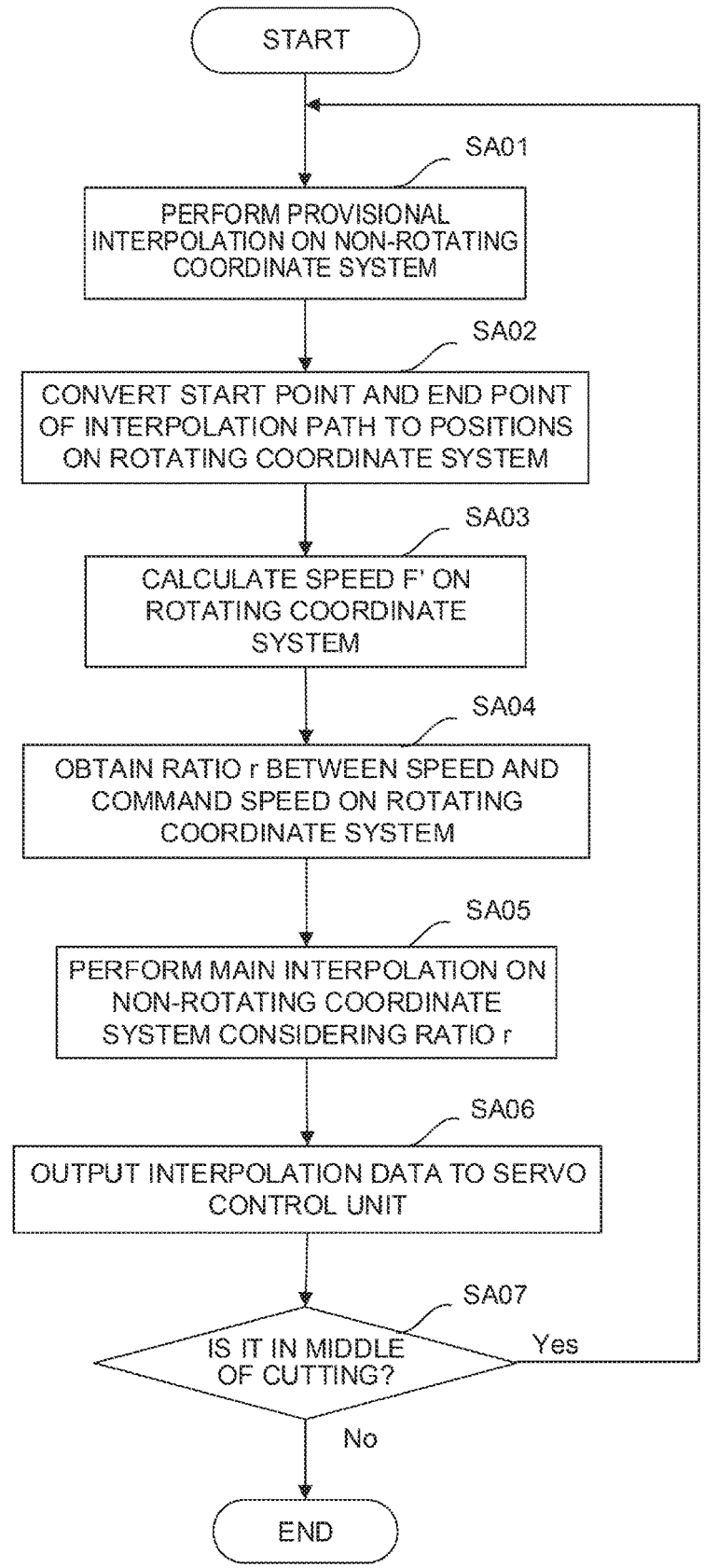
FIG. 4 is a schematic flowchart illustrating flow of the extended interpolation processing.
Figure 5:
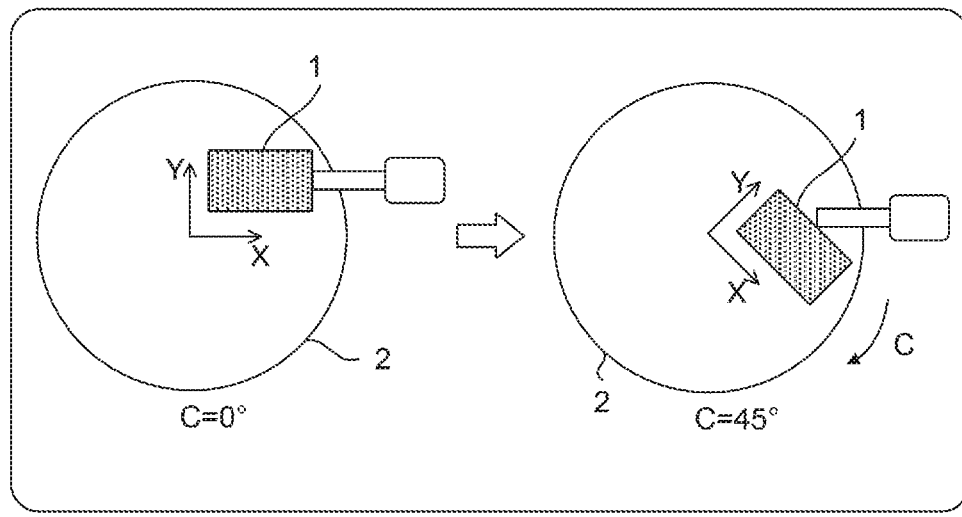
FIG. 5 is a view for describing a rotating coordinate system.
Figure 6:
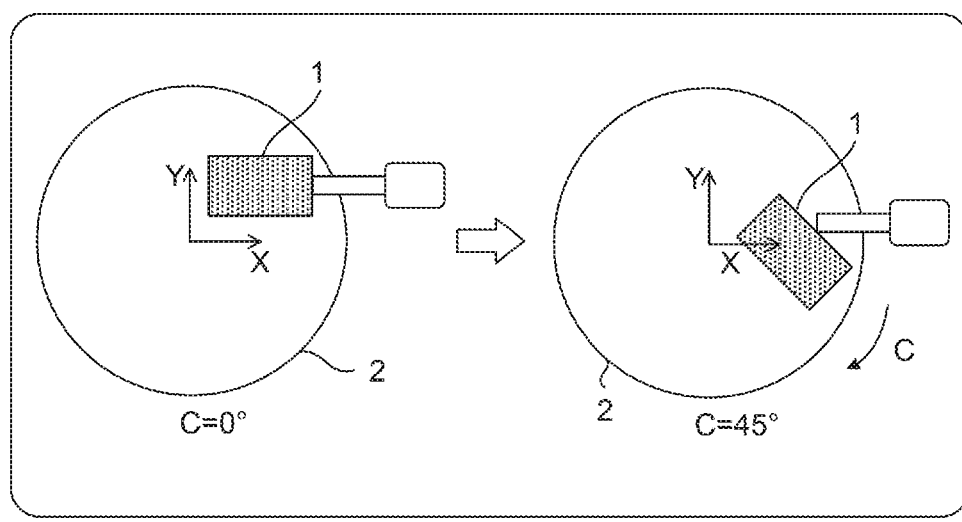
FIG. 6 is a view for describing a non-rotating coordinate system.
Figure 7:
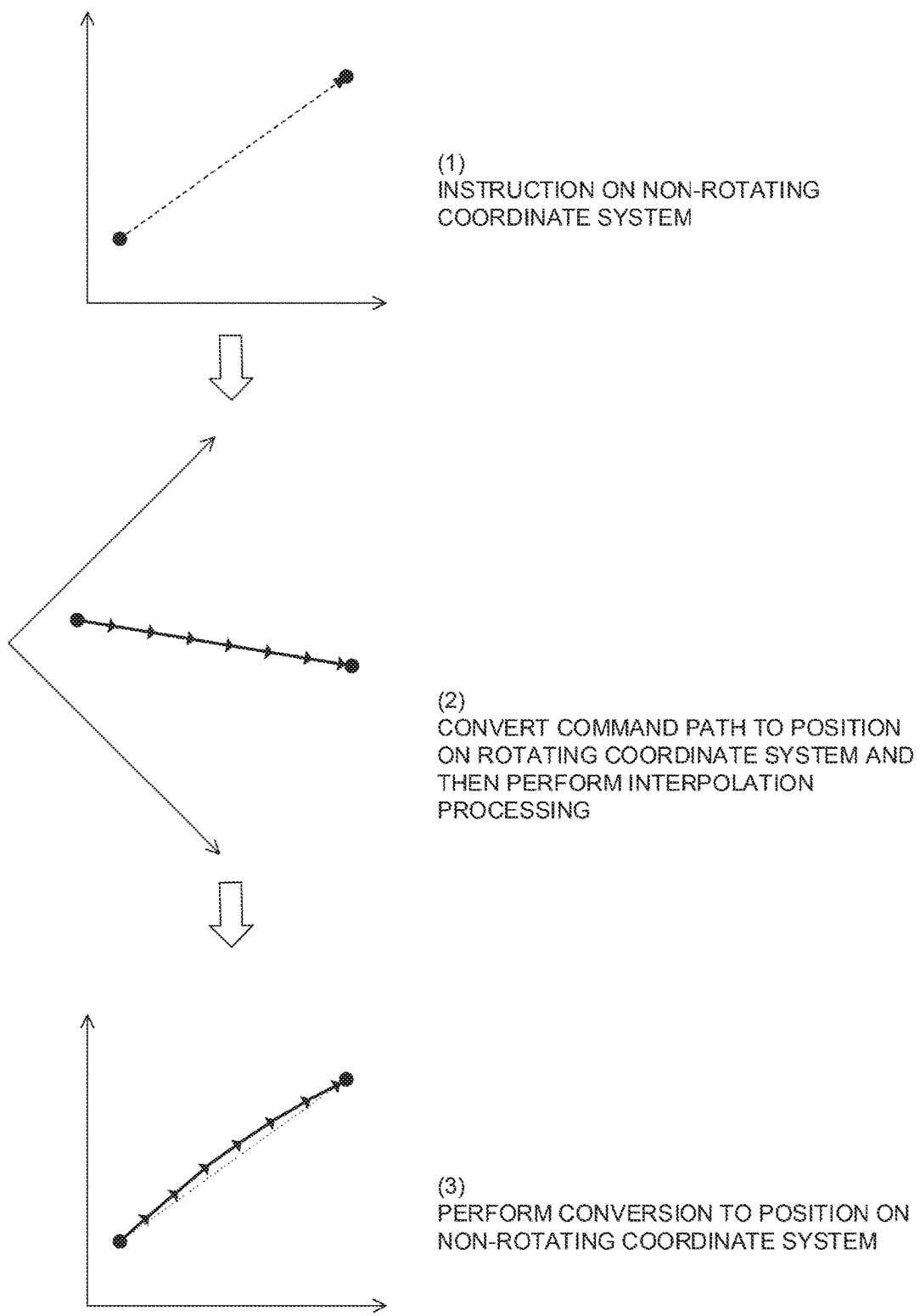
FIG. 7 is a view for describing an operation in the case of performing interpolation processing on the rotating coordinate system.

FIG. 4 is a schematic flowchart of processing performed on the extended interpolation unit 112 illustrated in FIG. 2. The processing is explained below according to respective steps

[Step SA01] The extended interpolation unit 112 performs provisional interpolation processing on the non-rotating coordinate system.

[Step SA02] The extended interpolation unit 112 converts the start point and the end point of the interpolation path obtained by the provisional interpolation processing in Step SA01 to positions on the rotating coordinate system.

[Step SA03] The extended interpolation unit 112 calculates the speed F' on the rotating coordinate system from the start point and the end point of the interpolation path on the rotating coordinate system obtained in Step SA02.

[Step SA04] The extended interpolation unit 112 obtains the ratio r of the velocity F' on the rotating coordinate system, calculated based on the result of the provisional interpolation processing, to the command speed F instructed by the machining program.

[Step SA05] The extended interpolation unit 112 performs the main interpolation processing on the non-rotating coordinate system using the speed, obtained by multiplying the command speed F by the reciprocal of the ratio r, as command speed.

[Step SA06] The extended interpolation unit 112 outputs interpolation data to the servo control unit 120 based on the interpolation path obtained in the main interpolation processing in Step SA05.

[Step SA07] The extended interpolation unit 112 determines whether or not the axis movement control based on the machining program 200 is being continuously performed. The processing proceeds to Step SA01 when the movement control is being continuously performed, and this processing is ended when the movement control has been completed.

With the above configuration, the relative speed between the tool and the workpiece is kept constant (at the command speed) when machining a workpiece by controlling the linear axis while rotating the workpiece relative to the tool by the rotational axis even when the command path instructed by the block of the machining program is long, and thus, it is possible to make quality of a cut surface constant.

The embodiment of the present invention has been described as above, but the present invention is not limited only to the above-described embodiment and can be implemented in various modes by applying suitable modifications.

For example, the above-described embodiment illustrates the exemplary configuration in the case of controlling the machine tool having the spindle, but the present invention can be applied even to a machine tool, such as a laser machining machine, having a mechanism to control output of a laser as a tool, for example. When the laser machining machine is controlled by the numerical controller of the present invention, it is possible to keep relative speed between the tool and a workpiece constant even when the workpiece is relatively rotated with respect to a laser emitting port by a rotational axis, and thus, it is possible to realize machining with constant laser output.

In addition, the above-described embodiment has been described with the exemplary configuration in which the extended interpolation unit 112 is provided in the interpolation unit 110, but the extended interpolation unit 112 may be provided outside the interpolation unit 110.

The invention claimed is:

1. A numerical controller, configured to control a machine tool, which has a plurality of linear movement axes and at least one rotational movement axis for a table and is provided with a tool, based on a machining program and to continuously machine a workpiece fixed on the table using the tool, the numerical controller comprising:
   an instruction analysis unit that reads an instruction block from the machining program and analyzes the read instruction block to generate movement command data for moving the tool relative to the workpiece; and
   an interpolation unit that performs interpolation processing based on the movement command data to generate and output interpolation data for each interpolation cycle,
   wherein the interpolation unit includes an extended interpolation unit which performs provisional interpolation processing according to command speed F, instructed based on the machining program on a non-rotating coordinate system, converts a start point and an end point of an interpolation path obtained by the provisional interpolation processing to positions on a rotating coordinate system to obtain speed F' on the rotating coordinate system, obtains a ratio r of the speed F' to the command speed F, and performs main interpolation processing on the non-rotating coordinate system at speed obtained by multiplying the command speed F by the reciprocal of the ratio r.

\* \* \* \* \*